US010405373B2

(12) United States Patent
Chai et al.

(10) Patent No.: US 10,405,373 B2
(45) Date of Patent: Sep. 3, 2019

(54) DISTRIBUTED CORE ARCHITECTURE FOR IMPLEMENTING WIRELESS COMMUNICATION NETWORKS

(71) Applicant: NEC Laboratories America, Inc., Princeton, NJ (US)

(72) Inventors: Eugene Chai, Monmouth Junction, NJ (US); Mohammad Khojastepour, Lawrenceville, NJ (US); Karthikeyan Sundaresan, Manalapan, NJ (US); Sampath Rangarajan, Bridgewater, NJ (US); Mehrdad Moradi, Ann Arbor, MI (US)

(73) Assignee: NEC CORPORATION (JP)

( * ) Notice: Subject to any disclaimer, the term of this patent is extended or adjusted under 35 U.S.C. 154(b) by 0 days.

(21) Appl. No.: 16/037,473

(22) Filed: Jul. 17, 2018

(65) Prior Publication Data

US 2019/0045580 A1 Feb. 7, 2019

Related U.S. Application Data

(60) Provisional application No. 62/541,049, filed on Aug. 3, 2017, provisional application No. 62/615,496, filed
(Continued)

(51) Int. Cl.
*H04M 3/00* (2006.01)
*H04W 84/18* (2009.01)
(Continued)

(52) U.S. Cl.
CPC ........... *H04W 84/18* (2013.01); *B64C 39/024* (2013.01); *H04B 7/18504* (2013.01);
(Continued)

(58) Field of Classification Search
CPC ......... H04W 36/08; H04W 8/02; H04W 4/02; H04W 12/00503; H04W 12/08;
(Continued)

(56) References Cited

U.S. PATENT DOCUMENTS

2010/0220687 A1* 9/2010 Reznik ................ H04W 36/005
370/331
2013/0281147 A1* 10/2013 Denman ................. H04W 4/10
455/518

(Continued)

OTHER PUBLICATIONS

Barritt et al, "Operating a UAV Mesh & Internet Backhaul Network using Temporospatial" SDN, 2017 IEEE Aerospace Conference, Jun. 8, 2017, pp. 1-7.
(Continued)

*Primary Examiner* — Joseph Arevalo
(74) *Attorney, Agent, or Firm* — Joseph Kolodka (57) ABSTRACT

A system for implementing a distributed core architecture of a wireless communication network is provided. The system includes a plurality of devices configured to communicate with one or more UE devices to implement the wireless communication network. A given one of the plurality of devices includes at least one processor operatively coupled to a memory and a core agent implemented by the at least one processor. The core agent includes a controller for controlling functionality of the device, a switch operatively coupled to the controller, a precomputed policy data store for storing precomputed policies associated with at least security and service, mobility and policy applications, and a set of core applications including an inter-agent communication application for communicating with other core agents associated with other devices of the wireless communication network, and a control application for controlling the device.

16 Claims, 6 Drawing Sheets

Related U.S. Application Data on Jan. 10, 2018, provisional application No. 62/641,970, filed on Mar. 12, 2018.

(51) Int. Cl.

| | |
|---|---|
| *B64C 39/02* | (2006.01) |
| *H04B 7/185* | (2006.01) |
| *H04W 24/02* | (2009.01) |
| *H04W 64/00* | (2009.01) |
| *H04W 72/08* | (2009.01) |
| *H04W 84/22* | (2009.01) |
| *H04W 92/02* | (2009.01) |
| *H04W 36/08* | (2009.01) |
| *H04W 84/06* | (2009.01) |

(52) U.S. Cl.
CPC ........ *H04B 7/18506* (2013.01); *H04W 24/02* (2013.01); *H04W 64/003* (2013.01); *H04W 72/082* (2013.01); *H04W 84/22* (2013.01); *H04W 92/02* (2013.01); *B64C 2201/122* (2013.01); *H04W 36/08* (2013.01); *H04W 84/06* (2013.01)

(58) Field of Classification Search
CPC ... H04W 28/08; H04W 36/0011; H04W 4/80; H04W 80/04; H04W 84/10; H04W 88/14; H04W 88/182; H04W 8/00

USPC .... 455/419, 414.1, 418, 407, 405, 566, 406, 455/552; 370/329

See application file for complete search history.

(56) References Cited

U.S. PATENT DOCUMENTS

| | | | |
|---|---|---|---|
| 2014/0094159 A1* | 4/2014 | Raleigh ................. | H04W 24/02 455/418 |
| 2014/0153392 A1* | 6/2014 | Gell ................. | H04W 28/0236 370/230 |
| 2014/0155043 A1* | 6/2014 | Gell ....................... | H04W 4/60 455/414.1 |
| 2016/0286043 A1* | 9/2016 | John ..................... | H04W 88/00 |

OTHER PUBLICATIONS

Jin et al, "SoftCell: Scalable and Flexible Cellular Core Network Architecture", Proceedings of the 9th ACM conference on Emerging Networking Experiments and Technologies, Dec. 2013, pp. 163-174.

Sundaresan et al, "SkyLiTE: End-to-End Design of Low-Altitude UAV Networks for Providing LTE Connectivity" NEC Labs America Technical Report 2018-TR001 Feb. 20, 2018 pp. 1-14.

* cited by examiner

DISTRIBUTED CORE ARCHITECTURE FOR IMPLEMENTING WIRELESS COMMUNICATION NETWORKS

RELATED APPLICATION INFORMATION

This application claims priority to U.S. Provisional Patent Application No. 62/541,049, filed on Aug. 3, 2017, U.S. Provisional Patent Application No. 62/615,496, filed on Jan. 10, 2018, and U.S. Provisional Patent Application No. 62/641,970, filed on Mar. 12, 2018, all incorporated by reference herein in their entirety.

This application is related to an application Ser. No. 16/037,536 entitled "IMPLEMENTING WIRELESS COMMUNICATION NETWORKS USING UNMANNED AERIAL VEHICLES", which is incorporated by reference herein in its entirety.

BACKGROUND

Technical Field

The present invention relates to wireless communication networks, and more particularly to distributed core architectures for implementing wireless communication networks.

Description of the Related Art

Wireless communication networks can transfer information or power between a plurality of nodes that are not connected by a conductor (e.g., wired). Many wireless communication technologies employ radio waves to communicate, although other types of electromagnetic waves and even acoustic waves can be utilized. One example of a wireless communication technology is Long-Term Evolution (LTE). LTE is a standard for high-speed wireless communication for mobile devices and data terminals developed by the 3$^{rd}$ Generation Partnership Project (3GPP), and is a registered trademark owned by the European Telecommunications Standards Institute (ETSI) for the benefit of the 3GPP Partners. LTE can be based on technologies such as, e.g., Global System for Mobile communication (GSM), Enhanced Data rates for GSM Evolution (EDGE), Universal Mobile Telecommunications System (UMTS) and/or High-Speed Packet Access (HSPA).

SUMMARY

According an aspect of the present principles, a system for implementing a distributed core architecture of a wireless communication network is provided. The system includes a plurality of devices configured to communicate with one or more UE devices to implement the wireless communication network. A given one of the plurality of UAVs includes at least one processor operatively coupled to a memory and a core agent implemented by the at least one processor. The core agent includes a controller for controlling functionality of the device, a switch operatively coupled to the controller, a precomputed policy data store for storing precomputed policies associated with at least security and service, mobility and policy applications, and a set of core applications including an inter-agent communication application for communicating with other core agents associated with other devices of the wireless communication network, and a control application for controlling the device.

According to another aspect of the present principles, a system for implementing a distributed core architecture of a wireless communication network is provided. The system includes one or more user equipment (UE) devices located within an area and a plurality of devices configured to communicate with the one or more UE devices to implement the wireless communication network. A given one of the plurality of UAVs includes at least one processor operatively coupled to a memory and a core agent implemented by the at least one processor. The core agent includes a controller for controlling functionality of the device, a switch operatively coupled to the controller, a precomputed policy data store for storing precomputed policies associated with at least security and service, mobility and policy applications, and a set of core applications including an inter-agent communication application for communicating with other core agents associated with other devices of the wireless communication network, and a control application for controlling the device.

According to yet another aspect of the present principles, a method for refactoring and extending core functionality to create a core agent of a device for implementing a distributed core architecture of a wireless communication network is provided. The method includes decoupling control and data planes to create a decoupled control plane and a decoupled data plane. The method further includes performing consolidation and optimization of the decoupled control plane and the decoupled data plane to compress the core functionality, including consolidating nodes of the decoupled control plane to create a mobility application and a policy application, and consolidating nodes of the decoupled data plane to create a precomputed policy data store for storing precomputed policies associated with at least security and service.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Wireless access and connectivity has large been a two-dimensional (terrestrial problem), where well-planned base stations are statically deployed in economically viable areas. Public safety networks (PSNs) are a component of infrastructure that ensures the ability to respond to emergency situations. The success of first responders, public safety personnel and the public in such challenging situations depends on the efficiency and effectiveness of the PSN to rapidly route large amounts of information between users. Thus, PSNs need resilience (e.g., the ability to operate under challenging scenarios) and robustness (e.g., the ability to tolerate and recover from unexpected failures), while offering sufficient bandwidth to provide first responders access to video, voice and/or sensor information that may be needed to succeed in an emergency mission. However, despite the advantages of a wireless communication based PSN ("wireless PSN"), a terrestrial-only wireless PSN may not be able to fully meet the goals of resilience and robustness in PSNs. For example, regarding robustness, degradation of such PSNs in an emergency situation may render these PSNs unable to cope with the communication demands of the community and the first responders.

To address the goals of resilience and robustness in PSNs and other types of networks, and to provide other wireless connectivity solutions, the embodiments described herein provide for wireless communication networks implemented using unmanned aerial vehicles (UAVs) (e.g., drones), which can have advantages over terrestrial-only wireless communication networks. For example, the illustrative UAV-based wireless networks described herein, which are mobile and geographically distributed to protect against localized disaster damage, can be re-positioned to replace or augment a fixed wireless network. Furthermore, UAV-based wireless communication networks in accordance with the embodiments described herein can be rapidly reconfigured to ensure that coverage and performance can meet the unique demands of an application (e.g., PSN). For instance, in the context of PSNs, UAV-based coverage can follow the movements of a fire-fighting team battling a quickly spreading wildfire in a remote mountain region.

One example of a wireless communication network that can be implemented using UAVs in accordance with the embodiments described herein is LTE. Such UAV-based LTE connectivity can be provided anywhere and at any time, without end-user reconfiguration of LTE devices. In the context of PSNs, such benefits can allow the public and first responders to focus on the response mission, rather than on the underlying network technology.

UAVs are generally lightweight, power-limited platforms with lower bandwidth links between them. Thus, several challenges can be encountered when adapting networks like LTE to a platform where both a node of a radio access network (RAN), such as an E-UTRAN Node B or Evolved Node B (eNodeB), and user equipment (UE) devices are mobile. These challenges can extend to both the RAN and the core network ("core") (e.g., Evolved Packet Core or EPC).

One challenge that a UAV-based communication network can pose to packet core network architecture includes unreliability of the RAN-packet core link. For example, in a PSN environment, there may not be underground infrastructure in place for carrying signaling and data traffic between RAN sites and core data centers. Furthermore, obstacles such as buildings and trees can exist between terrestrial vehicles and the UAVs. Thus, regardless of where the core network is realized, the link between the core and RAN can be highly unreliable, which can substantially reduce the number of data connections that can be supported and can increase the control plane delay of the packet core in time-critical operations (e.g., priority access to the fire department in the context of a PSN). Accordingly, a desired packet core can overcome unreliability in the RAN-packet core link.

Another challenge that a UAV-based communication network can pose to packet core network architecture is that UAVs can have limited available resources (e.g., constrained power and compute resources). A large amount of pressure can be put on the UAVs and RAN due to the complexity of the packet core. Accordingly, a desired packet core should limit UAV overhead.

Another challenge that a UAV-based communication network can pose to core network architecture is increased mobility load on the packet core. For example, as mentioned, UAVs can have limited battery resources so they may have to frequently land for recharging. This disruption in the communication network can increase packet core load because existing devices must be forced to handover to other UAVs, in advance of UAV landing. Accordingly, a desired packet core can be optimized for network-initiated device handover.

Yet another challenge that a UAV-based communication network can pose to packet core network architecture is seamless functionality. For example, a geographic area (e.g., country) can be organized into a plurality of regions managed by a single packet core (e.g., EPC). When users cross boundaries of such regions, the users can experience significant service disruptions due to a lack of 3GPP standard or mechanism for inter-core mobility. Providing such functionality is non-trivial since it can result in many changes to the packet core network architecture. In the PSN context, if someone wants to deploy multiple core instances, the disconnect in the packet core functionality can be even larger.

Figure 1:
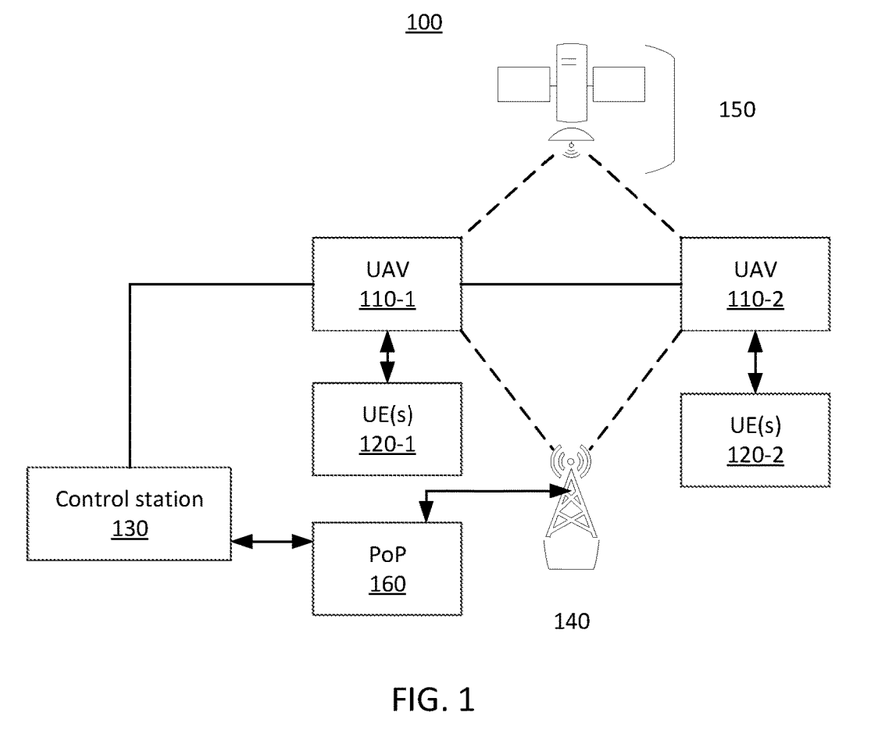
FIGS. 1 and 2 are block diagrams illustrating wireless communication networks implementing unmanned aerial vehicles (UAVs), in accordance with the present principles.
Figure 2:
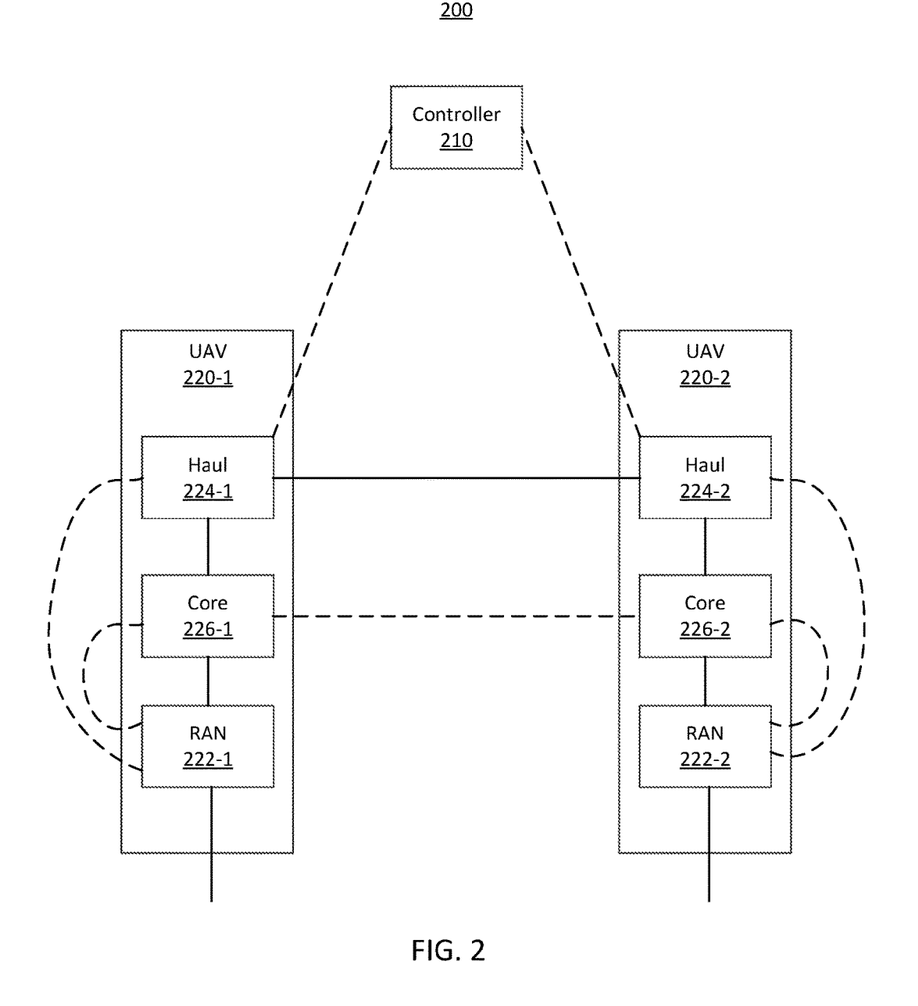

The embodiments described herein with reference to FIGS. 1 and 2 describe exemplary network architectures for implementing a UAV-based wireless communication network. It is noted that one could increase the operational lifetime by having the UAVs tethered to a power/data source. However, such tethering could significantly restrict deployment flexibility to only accessible areas on the ground (e.g., potentially less useful in disasters), as well as coverage and optimization capabilities. Thus, the embodiments described herein with reference to FIGS. 1 and 2 will focus on the untethered UAV scenario for describing the most flexible version of UAV network deployment. However, it is to be appreciated that tethered UAV scenarios can be contemplated.

Examples of UAV networks contemplated in accordance with the embodiments described herein include high-altitude platform (HAP) networks and low-altitude platform (LAP) networks. HAP networks aim to provide wireless connectivity solutions to unconnected parts of the world by operating at high altitudes (for wider coverage) to provide connectivity over large geographical regions over longer periods of time. LAP networks aim to provide wireless connectivity solutions on-the-fly in regions where additional capacity/coverage may be needed, such as stadiums, concerts, etc. By targeting short-term connectivity solutions over limited geographic regions, LAP network solutions operate at a much smaller scale at lower altitudes (e.g., in the troposphere from several hundred meters to a few kilometers) as compared to HAP networks.

The UAV network architecture can be realized as a stand-alone infrastructure or an Internet-backhauled infrastructure. A stand-alone infrastructure (e.g., stand-alone LTE connectivity infrastructure) does not backhaul or connect to the Internet. In cases where no pre-existing connectivity infrastructure is available, the stand-alone infrastructure can be useful for providing connectivity and communication (e.g., in the context of PSNs, between first responders, emergency services and people). In an Internet-backhauled infrastructure, in addition to the stand-alone services that can be delivered, an Internet point-of-presence (PoP), such as, e.g., a ground station or macro-cell, can be provided to connect to the Internet. This can be useful to provide Internet access to areas with limited to no connectivity.

Referring to FIG. 1, an overview of a wireless communication network 100 implementing UAVs is illustratively depicted in accordance with one embodiment of the present principles. In one embodiment, the network 200 is configured to implement a public safety network.

As shown the network 100 includes UAVs 110-1 and 110-2, UE device(s) 120-1 and UE device(s) 120-2, and a control station 130 (e.g., terrestrial vehicle). The UAV 110-1 is shown in communication with the UE device(s) 120-1 and the UAV 110-2 is shown in communication with the UE device(s) 120-2 to provide RAN traffic. Although two UAVs and UE devices are shown, any number of UAVs and UE devices can be included in the network 100, in accordance with the embodiments described herein. For example, although each of the UAVs 110-1 and 110-2 are shown in communication with only a single UE device, the UAVs 110-1 and 110-2 can each communicate with a plurality of UE devices.

The UAVs 110-1 and 110-2 can carry a base station including a node (e.g., eNodeB) to provide connectivity to the UE devices 120-1 and 120-2 on the ground to form the RAN. Connections between the UAVs 110-1 and 110-2 and the UAV 110-1 and the control station 140 are illustrated by a solid line. The solid line indicates in-band (e.g., ground station) Command and Control (C&C). The connections between the UAVs 110-1 and 110-2 can form a wireless multi-hop mesh network (in the air) which constitute the backhaul for sending backhaul traffic between the UAVs 110-1 and 110-2.

To provide C&C for the UAVs 110-1 and 110-2, the RAN and backhaul connectivity for C&C (in addition to data/payload) could be leveraged. However, given the mobile and multi-hop nature of the backhaul, this may not guarantee connectivity for, e.g., safety-critical operations. Reliable C&C connectivity to the UAVs 110-1 and 110-2 can be achieved through a static, always-reachable network node.

For example, as shown in FIG. 1, the static, always-reachable network node can be implemented via a terrestrial (macro) node 140 (e.g., eNodeB) (less expensive option) and/or via an aerial node (e.g., satellite) 150 (more expensive option). The satellite 150 may be used to achieve reliable C&C in, e.g., HAP networks. Connections from the UAVs 110-1 and 110-2 to the terrestrial node 140 and/or to the satellite 150 are illustrated by a dashed line indicating out-of-band C&C.

To achieve a UAV-driven RAN in accordance with the embodiments described herein, the UAVs should be positioned to create multiple cells (e.g., LTE cells) on-demand and provide adequate coverage (e.g., above a certain minimum rate) and capacity to all devices/users in a region of interest. Given the shorter altitude of a LAP network (e.g., less than 400 feet), the wireless link between the UAVs and the UE devices on the ground can be subject to various obstacles (trees, foliage, buildings, houses, etc.), which can significantly affect the signal strength and data rates on the links across various positions of the UAVs as well as across different UE devices.

Referring now to FIG. 2, an overview of a network 200 implementing UAVs to provide a wireless communication network (e.g., LTE) is illustratively depicted in accordance with one embodiment of the present principles. In one embodiment, the network 200 is configured to implement a public safety network.

The goal of a UAV network for providing wireless connectivity is to provide optimized coverage for a given (terrestrial) area, given a number of UAVs. In one embodiment, the approach taken by the network 200 to provide coverage includes a bootstrapping phase and a periodic update phase.

During the bootstrapping phase, the network 200 can partition the given area into smaller coverage zones, where each zone is covered by a single UAV. The architecture 200 can then determine the configuration of each of the UAVs to optimize both RAN as well as backhaul connectivity and routing jointly. Here, the design targets the support of a minimum desired traffic demand for every UAV to every other UAV in the backhaul during the bootstrapping phase. Also, additional UAVs can be minimally deployed to provide a high-capacity, reliable, mesh backhaul in the process.

After the bootstrapping phase and during the periodic update phase, once the location of the UE devices and traffic demands between different entities in the UAV network (as well as to/from the Internet) are estimated, every subsequent update phase will reconfigure the UAVs to cater to the spatio-temporally observed network and traffic conditions. Hence, based on changing conditions, UAVs can be removed from over-provisioned areas or added to under-provisioned areas (as needed).

To determine UAV configuration as well as routing on the backhaul, hardware (e.g., a flexible UAV platform) and software (e.g., pseudo-joint optimization) approaches are utilized by the architecture.

Regarding hardware, note that the connectivity on the UAV is achieved through two sets of antennas, one for RAN and the other for backhaul. If the UAV platform can support decoupled antenna mounts for RAN and backhaul connectivity, this could weaken the coupling between RAN and backhaul optimization (e.g., orientation of the RAN link will no longer affect that of the backhaul link and vice versa). Hence, the UAV can have separate RAN and backhaul configurations. The position of the UAV can still be common to those two configurations. However, a sequential optimization can be sufficient to handle this coupling, which is less stringent than before. First, the UAVs can independently (e.g., locally) configure themselves for RAN optimization. Then, given their RAN configurations and RAN traffic demands, the UAV backhaul configurations (position fixed from RAN configuration) and traffic routing over the backhaul are determined. If the backhaul optimizations requires additional backhaul-specific UAVs to be deployed, these UAVS can also have their position determined as part of their configuration.

Regarding software, the antenna mounts for both RAN and backhaul can be coupled to the UAV's frame, and hence can be dependent on one another. In this case, a more closely coupled optimization may be needed between the RAN and the backhaul. As before, each of the UAVs will first determine their RAN configuration. However, instead of picking the most optimal RAN configuration, each UAV will determine an acceptable set of RAN configurations (e.g., based on some RAN performance requirements). Then, given the set of (feasible) RAN configurations for each UAV, the backhaul configuration for each UAV is jointly selected from its respective set of RAN configurations to optimize backhaul performance. Having a larger configuration space for each UAV after RAN optimization allows for the architecture 300 to strike a balance between RAN and backhaul performance without being biased toward RAN performance.

Thus, the network 200 employs a hybrid design by adopting a decentralized RAN optimization that is executed locally at each of the UAVS in parallel, and a centralized backhaul optimization for determining the configuration of the UAVs and routing on the backhaul. A decentralized approach to RAN optimization allows the network 200 to track and optimize for UE device dynamics that vary at fin time scales (e.g., seconds), while being highly scalable in a large UAV network. In contrast, with the backhaul dynamics varying at coarse time scales (e.g., minutes), the architecture 200 leverages a centralized approach to realize optimal backhaul configuration and routing. Such a hybrid design allows the architecture 200 to strike an effective balance between performance and scalability.

More specifically, to employ the hybrid design, the network 200 includes a controller 210 (which can be in the air or on the ground), and UAVs including UAV 220-1 and UAV 220-2. Although two UAVs are shown in this illustrative embodiment, any number of UAVs can be implemented in accordance with the embodiments described herein. As shown, the UAV 220-1 includes a RAN agent 222-1, a haul agent 224-1, and a core agent 226-1. Similarly, the UAV 220-2 includes a RAN agent 222-2, a haul agent 224-2, and a core agent 226-2. Dashed lines between components of the network 300 represent control plane, and solid lines between components of the network 200 represent data plane.

The RAN agents 222-1 and 222-2 run locally in each respective UAV 220-1 and 220-2 and, for each respective UAV 220-1 and 220-2, are responsible for determining UAV configuration for optimized RAN performance in the corresponding designated terrestrial zone. The terrestrial zone that is to be covered by a given one of the UAVs with some performance requirements (e.g., above a certain SNR/rate for each UE device in the zone) and configuration capabilities (movement/position), transmit power, antenna pattern (tilt/yaw) of the UAV are known. Given the performance requirements and configuration capabilities for the given UAV, a set of points exists in the three-dimensional airspace (along with appropriate UAV transmit parameters for each point) from which the given UAV will be able to deliver coverage in the designated terrestrial zone.

Assuming for the sake of illustration that the given UAV corresponds to the UAV 220-1, to determine the UAV configuration for optimized RAN performance, the RAN agent 222-1 estimates the operational airspace for the UAV. Then, the RAN agent 222-1 determines where to position the UAV 220-1 in the airspace to deliver optimized coverage performance for the current set of UE devices in its designated coverage zone. Thus, while the operational airspace is constructed generic to the designated coverage zone, the eventual positioning of the UAV 220-1 is optimized for the location of the UE devices in its designed coverage zone.

To determine where to position the UAV 220-1 in the airspace, the RAN agent 222-1 can leverage RAN and its synchronous transmission characteristics to automatically localize the UE devices. The RAN agent 222-1 can do this without relying on GPS functionality by sampling a few locations in its airspace, using reference signal channel measurements from the UE devices to estimate the range (from time of flight) to the UE devices from each of those points and, knowing the location of the UAV 220-1 (e.g., using GPS) at different points, employing trilateration to solve for the location of the UE devices.

Once the locations of the UE devices are estimated, the RAN agent 222-1 can construct a radio frequency (RF) map of its airspace for each of the UE devices that can predict RF signal strength at the UE devices with high accuracy for each of the positions of the UAV 220-1 in the airspace. To quickly create the RF map (without exhaustively conducting measurements to UE devices from all points in the airspace), the RAN agent 222-1 can leverage the location of all the UE devices to design a hierarchical measurement trajectory for the UAV 220-1. For example, the UAV 220-1 can perform a coarse sampling at different points in the airspace and, based on statistics obtained by the sampling, perform a fine sampling of specific regions as needed to construct an accurate RF map for all of its corresponding UE devices. With the RF maps for all of the UE devices estimated, the RAN agent 222-2 can solve an optimization problem, based on desired coverage objective, to either determine an optimal configuration of operation (e.g., when RAN and backhaul are weakly coupled) or narrow down a set of efficient configurations (e.g., when RAN and backhaul are tightly coupled).

It is noted that, with the UAVs 220-1 and 220-2 operating their corresponding RAN agents 222-1 and 222-2 in parallel, it can be possible that the airspace of the UAVs 220-1 and 220-2 overlap. In such cases, the UAVs 220-1 and 220-2 can follow an implicit priority ordering to avoid collision. For example, when the UAVs 220-1 and 220-2 are within a minimum separation range (MSR) of each other, the lower priority UAV among UAVs 220-1 and 220-2 can stop in its trajectory and wait for the higher priority UAV among UAVs 220-1 and 220-2 to move outside the MSR before carrying on with its trajectory.

The haul agents 224-1 and 224-2 are responsible for coordinating the optimization of backhaul connectivity. For its centralized backhaul optimization, the network 300 can leverage the same control channel and associated controller 210 that is used for the UAV network's C&C. The controller 210 can adopt a software-defined networking (SDN) approach to gather all relevant backhaul information from the haul agents 224-1 and 224-2 necessary to run the centralized optimization, as well as deliver the resulting computed configurations and traffic routing policies back to the UAVs 220-1 and 220-2 through their respective haul agents 224-1 and 224-2 to execute routing policies. The haul agents 224-1 and 224-2 can periodically gather information regarding incoming traffic demand (to the respective RAN agents 222-1 and 222-2) and outgoing traffic demand (from the respective RAN agents 222-1 and 222-2) at the respective UAVs 220-1 and 220-2, backhaul capabilities (e.g., energy resources, antenna mount, number of radio interfaces, connectivity technology) of the UAVs 220-1 and 220-1, as well as candidate UAV configurations based on the optimization performed by the RAN agents 222-1 and 222-2.

The haul agents 224-1 and 224-2 can communicate this information to the controller 210, which can use this information as input along with the remaining number of UAVs available for deployment to run its backhaul optimization. The goal of the backhaul optimization is to configure the backhaul to support the observed traffic demand from the RAN, while deploying a minimum number of UAVs as needed. Note that since the UAVs are locally optimized from a RAN coverage perspective, the UAVs may not be optimally connected to each other to form a high-capacity, reliable mesh backhaul. Hence, in such cases, the controller 210 can automatically determine the need to add or prune UAVs as needed from the network 200. While the controller 210 generally runs its optimization periodically, in the event of unplanned UAV dynamics (e.g., UAVs going down for energy replenishment), the controller 210 can invoke on-demand optimization for a backhaul reconfiguration.

The controller 210 can also determine an appropriate allocation of channels at each of the UAVs to minimize/avoid wireless interference between neighboring transmitters and maximize the traffic flow that can be routed over the backhaul (e.g., in the case of sub-6 GHz backhaul connectivity). On the other hand, when leveraging high frequency directional technologies (e.g., mmWave technology and free-space optical communication (FSO) technology) for a backhaul, wireless interference is less of a concern. Since directional antenna technologies are candidates for the backhaul, backhaul topology and interference can be determined by wireless channels (frequency) as well as spatial channels (beam orientations) allocated to each of the UAVs to create desired high-gain directional backhaul links between the UAVs. The haul agents 224-1 and 224-2 can illustratively leverage a cost-effective high-bandwidth mmWave technology (e.g., 60 GHz) for its backhaul, when moderate backhaul ranges of, e.g., about 1-2 Km are sufficient.

The core agents 226-1 and 226-2 can adopt edge packet core, illustratively EPC, by collapsing the entire EPC and pushing the EPC to the edge of the network, namely at each of the UAVs 220-1 and 220-2 themselves. Each of the core agents 226-1 and 226-2 can implement core network functionality.

The core network functionality can include Mobile Management Entity (MME) functionality, Serving Gateway (SGW) functionality, a Home Subscriber Service (HSS) functionality, Packet Data Network (PDN) node Gateway (PGW) functionality, and Policy and Charging Rules Function (PCRF) functionality.

With each UAV 220-1 and 220-2 running its own core agents 226-1 and 226-2, respectively, even a simple eNB-eNB handoff across the UAVs 220-1 and 220-2 becomes an MME-MME or inter-MME handoff, which is accomplished across the core agents 226-1 and 226-2. Hence, the core agents 226-1 and 226-2 enable a new control/data interface to enable core-core signaling and communication directly between the UAVs 220-1 and 220-2 to handle mobility right at the edge.

To reduce compute footprint on the UAVs 220-1 and 220-2, as will be described in further detail with reference to FIG. 4, the core agents 226-1 and 226-2 can adopt a software refactoring approach to eliminate distributed core interfaces and collapse all distributed functionalities into a single logical entity. For example, the distributed data plane functions can be transformed into a series of switching flow tables and associated switching actions, corresponding to network functions like General Packet Radio Service (GPRS) Tunneling Protocol (GTP) encapsulation/decapsulation, charging, etc. Additionally, control plane signaling and latency can be reduced by pre-computing and storing (e.g., in-memory) several key attributes relating to security keys, Quality of Service (QoS) profile, etc. for the UE devices that can be accessed locally and quickly in real-time or near real-time (e.g., without any computation).

With a core agent being located on each of the UAVs 220-1 and 220-2, the tracking area for a UE device corresponds to a single node (e.g., eNodeB) of a UAV, as compared to a set of nodes. To address the problem of locating UE devices during mobility, the core agent at any UAV automatically broadcasts the detection of a new (incoming) UE device (e.g., in active-mode or idle-mode) to the other core agents in the network 200. While the detection of an active-mode UE device is simple, the detection of an idle-mode UE device can be difficult. However, since the tracking area of the UE device changes as it moves from one UAV to another, the UE device can request a tracking area update although it is in an idle-mode.

The MME node in a core agent can detect the arrival of a new UE device, and the HSS node in a core agent can maintain the location (anchoring core agent) of all UE devices in the network. When a core agent (e.g., core agent 226-1) sends a UE device location update, the core agents in other UAVs (e.g., core agent 226-2) can update their HSS nodes accordingly. Thus, whenever traffic needs to be sent from a core agent to a specific UE device located at another UAV, the HSS node can reveal the destination core agent at which the UE device is anchored and to whom the traffic has to be routed. The actual routing path to be taken by the traffic on the mesh backhaul can then be determined by the haul agent at the UAV.

The core agents push the core functionality to the edge of the core network, and collapse the core into a lightweight and self-contained entity that is co-located within each of the UAVs. Being completely distributed at the edge of the network, such a distributed core architecture eliminates wireless on the core-RAN (e.g., EPC-RAN) path and hence the drawbacks faced by legacy network architecture. Further, to ensure complete core functionality, mobility is managed right at the edge of the network, thereby enabling a control-data interface to realize efficient inter-core signaling and communication directly between the UAVs. This allows the core agents on each UAV to proactively synchronize states with each other, thereby avoiding real-time impact of wireless (UAV-UAV) links on control functions. This can result in fast and seamless handoff of active-mode UE devices as well as tracking of idle-mode UE devices across multiple UAVs.

It is noted that while the haul agents adopt a centralized approach to optimization, the core agents follow a distribution approach to optimization similar to the RAN agents. The rationale behind such a design stems from the fact that RAN agents and the core agents deal directly with individual UE devices having a time scale of dynamics that warrants a local, distributed approach, while, in contrast, the haul agents deal with aggregate traffic (e.g., from multiple UE devices), whose coarse time scale of dynamics allows for a centralized approach.

Further details regarding core agents will be described below with reference to FIGS. 4-6.

The architecture described in FIG. 2 is a high-level overview of an end-to-end design exploring the functionality of a UAV network for providing wireless connectivity. The optimal design choice for the UAV platform, radio interfaces, access/core techniques and optimizations, etc. can vary from one set of application requirements to another (e.g., LAP vs. HAP, small v. large coverage, short vs. long timespan). Accordingly, the embodiments described herein can be applied to a variety of solutions utilizing distributed UAV networks providing wireless connectivity.

Figure 3:
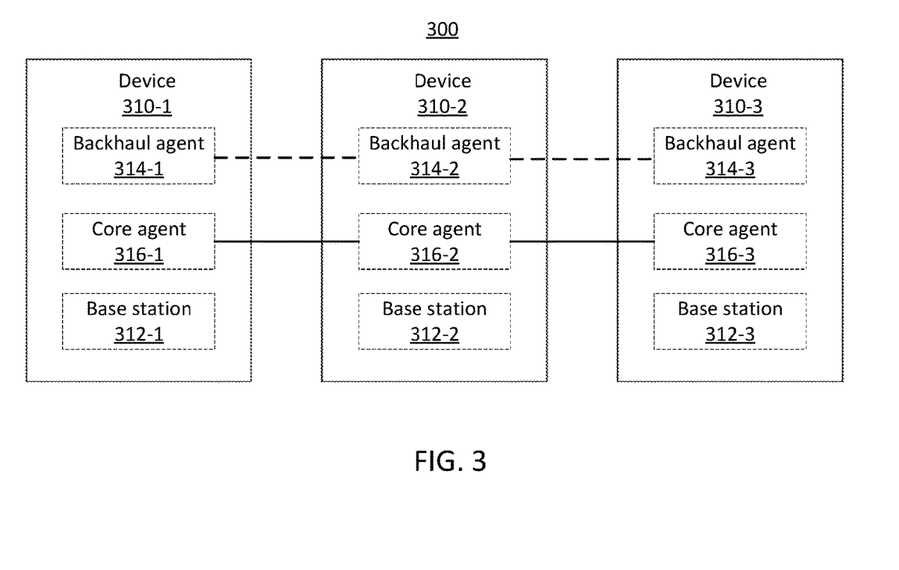
FIG. 3 is a block diagram illustrating an overview of a wireless communication networking implementing devices each including a core agent, in accordance with the present principles.

Although the core agents have been described in the context of UAVs with respect to FIG. 2, the core agents described herein can be implemented for use in any distributed core architecture. For example, the embodiments described herein with reference to FIGS. 3-5 provide for a distributed core architecture that can implement a wireless communication network (e.g., the UAV-based network described above). For example, the embodiments described herein can provide for a wireless packet core for LTE RAN. The wireless packet core can operate in the air, and can collapse and prune core nodes (e.g., EPC nodes) and protocols into simple and compact network policies. In one embodiment, the wireless packet core can be implemented in the context of public safety.

The network policies can be distributed into a set of per-device wireless packet core agents. An agent described herein can have a variety of differences as compared to conventional agents. For example, an agent described herein is more lightweight and modular to incur minimal overhead on its corresponding device as compared to conventional agents, is programmable with fine-grained rules, and can interact with other agents to provide seamless mobility support (e.g., in disaster regions).

Referring to FIG. 3, an overview of a wireless communication network 300 is illustratively depicted in accordance with one embodiment of the present principles. In one embodiment, the network 300 can be implemented within a PSN. However, the embodiments described herein should not be construed as being limited to the PSN context. Dashed lines between components of the network 300 represent wireless backhaul, and solid lines between components of the network 300 represent control plane protocols and/or data plane protocols.

As shown, the network 300 includes a plurality of devices (e.g., UAVs), including devices 310-1, 310-2 and 310-3. In one embodiment, the devices 310-1 through 310-3 are homogeneous. The network is strongly connected in the air, since the packet core network enables users (e.g., first responders, general public) connected to any of the devices 310-1 through 310-3 to exchange traffic with the users connected to other nodes. UE devices can be configured to connect to respective LTE cells on the devices 310-1 through 310-3 when they appear in an area. In the context of PSN, a PSN operator can define various services (e.g., video, voice and text) for different disciplines and the general public. For example, priority access can be given those of the UE devices belonging to emergency services, such as police and fire departments.

Each of the devices 310-1 through 310-3 carries a plurality of lightweight and programmable agents that can form a wireless network where each agent is connected to a nearby agent.

For example, shown, the device 310-1 carries an aerial base station (e.g., RAN) 312-1, the device 310-2 carries an aerial base station 312-2 and the device 310-3 carries an aerial base station 312-3. In one embodiment, each base station 312-1 through 312-3 includes a node (e.g., eNodeB) associated with an LTE network. Further details regarding the base stations 312-1 through 312-3 are described above with reference to FIG. 2.

In addition, the device 310-1 carries a backhaul agent 314-1, the device 310-2 carries a backhaul agent 314-2 and the device 310-3 carries a backhaul agent 314-3. The agents 314-1 through 314-3 can be lightweight and programmable, and can form a wireless network where each agent is connected to a nearby agent. Further details regarding the backhaul agents 314-1 through 314-3 are described above with reference to FIG. 2.

Moreover, the device 310-1 carries a core agent 316-1, the device 310-2 carries a core agent 316-2 and the device 310-3 carries a core agent 316-3. In one embodiment, the core agents 316-1 through 316-3 include a "master" core agent and other "slave" core agents. The master core agent is responsible for global optimization of the network 300, and can periodically collect different information from the slave core agents. For example, the master core agent can collect the loss rate on links between different core agents, the remaining battery information of the devices 310-1 through 310-3, the amount of traffic exchanged between the devices 310-1 through 310-3, etc. The master core agent can use this collected information to globally reconfigure the placement of the devices 310-1 through 310-3 and traffic routing rules (e.g., the placement of UAVs the air).

The core agents of the network 300 can seamlessly exchange control and data traffic by leveraging overlays (e.g., SDN overlays) to create two virtual network layers, or slices, on top of the physical device network. One network slice can be used for control plane traffic between core agents, and the other network slice can be used for data traffic. The separation of the control and data traffic ensures that time-critical control plane traffic is not affected when the network is saturated. To form the overlays, traffic tunneling can be used. However, as will be further described, since existing traffic tunneling approaches require frequent changes to the network configuration, the embodiments described herein adopt a variant of segment-based routing and perform an optimization (e.g., based on the P4 language), thereby allowing operators to define new packet headers for switches (e.g., SDN switches).

More specifically, each pair of neighboring (e.g., geographic proximity) core agents can be interconnected using a tunnel defined with a label. Whenever a core agent decides to send control or data plane traffic to any other core agent in the network, the core agent can push a stack of labels onto the packets. The top-of-the-stack (TOS) label corresponds to the next tunnel segment the packet must traverse. Whenever the core agent receives a packet from its corresponding neighboring core agent, the core agent can check the TOS label from the packet and forward the packet based on the inner label to its neighboring core agent. The master core agent among the core agents can be responsible for computing the label stack that each of the core agents uses to communicate with the other core agents. Instead of adding separate packet headers (e.g., Multiprotocol Label Switching (MPLS) packet headers) for each label, a new packet header can be designed (e.g., based on the P4 language) to contain all of the labels in the stack to reduce overhead. Switches can be equipped with new actions to read the labels at different positions.

One of the devices can be (periodically) selected to double up as a master agent that is responsible for global route computation based on the information (periodically) collected from other core agents (e.g., average loss rate and bandwidth on wireless links between different core agents (devices), remaining battery capacity on the devices, and the amount of traffic demand between different devices). The master agent uses this information to compute and disseminate forwarding rules for routing traffic over the mesh backhaul in the network 400.

Conventional approaches of establishing per-UE tunnels (e.g., GTP-U tunnels) can require frequent tunnel updates (e.g., tear down, modification or set up). Similarly, employing a tunnel between each pair of core agents, akin to remote DC-DC tunnels, can require updates to a large fraction of the tunnels, even when only a small number of devices move. In contrast, most of the tunnel segments of the network 300 do not change in such scenarios as they are designed to carry aggregate traffic only between nearby pairs of devices. Accordingly, the proximity-based segmentation scheme described herein enables scalability.

Further details regarding the core agents 316-1 through 316-3 will now be described in further detail below with reference to FIG. 4.

Figure 4:
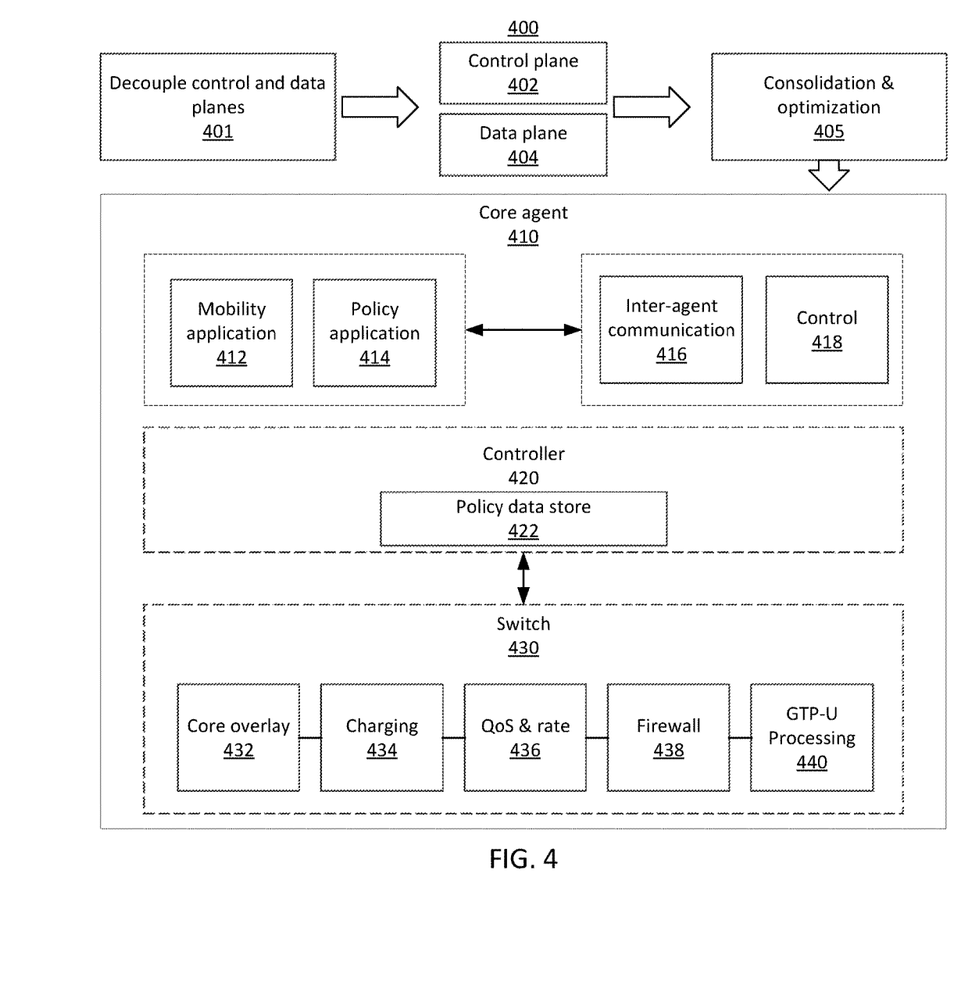
FIG. 4 is a block/flow diagram illustrating an exemplary architecture for implementing a core agent of a device, in accordance with the present principles.

Referring now to FIG. 4, a block/flow diagram of a distributed core architecture 400 is illustratively depicted in accordance with one embodiment of the present principles. As will be described in further detail, the distributed core architecture 400 can refactor and extend core functionality (e.g., EPC functionality) into a (lightweight) core agent 410 having interfaces for interaction with the local device (e.g., local UAV) and other devices (e.g., other UAVs) of a distributed wireless network. The steps taken to refactor and extend the core functionality into components of the core agent 410 for making the core functionality suitable for devices in a distributed network (e.g., UAVs) include decoupling control and data planes 401, and consolidation & optimization 405.

Data plane 404 is responsible for enforcing operator policies (e.g., Deep Packet Inspection (DPI), QoS classes, accounting) on traffic. Control plane 402 has a variety of responsibilities, including configuring the data plane, and running main cellular control functions such as mobility and security management. Since MME, PCRF and HSS are pure control nodes, the decoupling performed at step 401 does not affect these elements, and only affects SGW and PGW. The nodes of the control plane 402 resulting from the decoupling performed at step 401 can include PGW-C, SGW-C, MME, PCRF and HSS, and the nodes of the data plane 404 resulting from the decoupling performed at step 401 can include SGW-D and PGW-D, where "C" stands for control and "D" stands for data. Accordingly, in the control plane 402, there are three types of control nodes: (1) SGW-C and PGW-C that are responsible for managing QoS policy enforcement and routing on user data traffic; (2) MME that exchanges signaling traffic with UE devices and base stations; and (3) PCRF and HSS that dynamically generate network security and QoS policies for other nodes.

The consolidation & optimization performed at step 405 can be broken down into a plurality of sub-steps.

For example, during a categorization sub-step, the nodes of the control plane 502 can be categorized based on their high-level functionality.

To compress the core functionality, during a first consolidation sub-step, the nodes in each category can be consolidated on top of a controller 420 of the core agent 410 and the distributed core protocols can be removed by collapsing the SGW-C, PGW-C and MME nodes into a lightweight set of applications including a mobility application 412 and a policy application 414. To collapse the SGW-C, PGW-C and MME nodes into the applications 412 and 414, internal functions in the MME node can be extracted and refactored into the mobility application 412, and internal functions in the SGW-C and PGW-C nodes can be extracted and refactored into the policy application 414. The mobility application 412 and the policy application 414 can illustratively include one or more SDN applications. One notable aspect of this consolidation is the elimination of, for example, complex distributed protocols (e.g., GTP-C) and continuous control messages from the core. The applications 412 and 414 still exchange information with each other, but through simpler mechanisms (e.g., local publish-subscribe mechanisms).

Generally, the HSS node can store database tables containing different UE devices states, and act as a proxy between the MME component and the database tables to perform different types of complex security and location tracking computations. The PCRF node can access a logical database (sometimes implemented in the HSS node) and dynamically generate different QoS and charging policies of UE devices.

To further compress the core functionality, during a second consolidation sub-step, the HSS and PCRF nodes can be eliminated from the device core and replaced with a precomputed policy data store 422. In one embodiment, and as shown, the precomputed policy data store 422 is an in-memory data store within the controller 420. The precomputation approach described herein not only reduces user perceived network access delay, but also makes the core very resource-efficient. Thus, precomputation (combined with in-memory transactions) can substantially minimize the overhead of the core agent 410 on a resource-challenged device (e.g., UAV). Further details regarding the precomputed policy data store 422 will be described below with reference to FIG. 5. Accordingly, the controller 420 can implement control plane functionality, such as MME node functions, SGW node control plane functions and PGW node control plane functions, without the nodes and distributed protocols and EPC nodes (e.g., GTP-C).

One of the key differences between core functionality implemented using legacy technologies and core functionality implemented using a distributed core network of core agents is the continuous interaction of the core agents with device hardware and APIs.

For example, as further shown, the core agent 410 includes a set of core applications, including an inter-agent communication application 416 for communicating with other core agents (e.g., other UAVs) and a control application 418 for controlling the device housing the core agent (e.g., controlling a UAV engine). As will be described in further detail below, the inter-agent communication application 416 can exchange control plane messages with neighbor core agents to proactively synchronize states, thereby enabling seamless mobility support (e.g., idle-mode mobility support and active-mode mobility support). Other applications that need to exchange information with each other can do so through local protocols (e.g., local publish-subscribe protocols). In the context of UAVs, the control application 418 can listen to flight change events from the UAV and remaining battery resources on the UAV. This can be necessary for the core agent 410 to properly handoff UE devices to each other (e.g., when a UAV needs to leave the network for recharging.

Since the distributed core architecture implemented using the core agent 410 is a flat architecture, the need for a hierarchical gateway on the device (e.g., UAV) corresponding to the core agent 410 is eliminated. Thus, to further compact the core agent 410, the functionality of the SGW-D and the PGW-D of the data plane 404 can be refactored into a single (software) switch 430. As shown, the switch 430 can include core overlay 432, charging 434, QoS & rate 436, firewall 438 and GTP-U processing 440. The switch 430 can be implemented as, for example, an OpenFlow switch, a P4 switch, etc.

Each data plane function in S/PGW-D can be implemented as a separate Match+Action table in the switch 430, where each Match+Action table can perform a lookup on a subset of user data traffic fields and apply the actions corresponding to the first match. User traffic travels through the Match+Action tables before leaving or entering the device (e.g., UAV). For example, the switch 430 can perform: (1) UL/DL data rate enforcement; (2) firewall operations; and (3) QoS control by transport-level mechanisms (e.g., setting DiffServ) based on a QoS class identifier (QCI) associated with each UE device. While legacy core technologies (e.g., EPC) tunnel the traffic of each UE device into two tunnel segments across the RAN, PGW-D and SGW-D, the embodiments described herein depart from this approach by terminating GTP-U tunnels inside the switch 430 (e.g., decapsulate GTP header from uplink packets sent by the base station and encapsulate a proper GTP-U header in down-link packets to the base station) because (1) per-UE tunnels (e.g., GTP-U tunnels) may not scale in distributed networks (e.g., UAV networks) as UE devices are mobile and the tunnels are subject to frequent changes and (2) the consolidation already eliminates the need for GTP-U tunnels between the SGW-D and PGW-D functionality.

As mentioned above, the precomputed policy data store 422 can replace the functionality of the HSS node of a wireless network (e.g., LTE). Such functionality can include security functionality. For example, Network Access Security in wireless networks (e.g., LTE) can rely on a shared user-specific key, K, that is stored in the HSS node and UE device (e.g., on a subscriber identity module (SIM) cards). The LTE security processes assume that cloned UE devices and spoof networks do not know the correct value of K. From K, the HSS can dynamically compute an authentication vector (AV) and an encryption vector (EV) as part of a larger attach process when UE devices switch on or enter an area with wireless network coverage. The wireless network and the UE device confirm each other's identifies using the AV, and the signaling traffic between the UE device and the wireless network is encrypted using the EV to ensure intruders cannot read and modify the signaling traffic.

The computation of the AV and EV vectors can involve resource-intensive cryptographic operations (F1-F9) on 256-bit long strings, thereby wasting valuable clock cycles. When there are only a few devices in the distributed network (e.g., UAVs), the overhead of computing the AV and EV vectors is manageable. However, when the devices are providing on-demand wireless (e.g., LTE) connectivity over a large geographical region, many UE devices are likely to send attach requests to the network at the same time. Such workloads can quickly use the available compute resources (for core) on the devices and substantially degrade the quality of experience (QoE) of users.

To resolve these issues, instead of real-time security vector computations being performed on the devices, a reasonable number of security vectors can be precomputed for each UE device and stored in the precomputed policy data store 422. AV and EV vector pairs are precomputed with the same K and RAND (a random number generated by the HSS node), but with different consecutive sequence (SQN) numbers. Different SQN numbers ensure that signaling messages cannot be replayed by intruders. Since each pair of AV and EV vectors is computed with a different SQN number, each AV and EV vector pair can be used only once during the attach procedure. For example, if the same AV and EV vector pair is reused, the UE device can reject the network assuming it is a spoof network that is trying to replay the old authentication messages. Thus, the core agent 410 can locally remove a used pair of AV and EV vectors and invalidate it at other core agents in the distributed network.

Note that the number of attach requests generated by a legitimate UE device when switching on or coming back into network coverage is limited. Hence, a small number of vectors can be computed for a given UE device. In the (rare) event that a UE device uses all of its precomputed vectors (e.g., due to frequent restarts), new vectors for the UE device can be computed in real-time and propagated to other core agents in the network.

Used AV and EV vector pairs can be invalidated at, and new vectors for the UE device can be propagated to, other core agents in the distributed network via the inter-agent communication application 416.

As further mentioned above, the precomputed policy data store 422 can replace the functionality of the PCRF node of a wireless network (e.g., LTE). Such functionality can include service functionality. For example, in legacy wireless networks (e.g., LTE), the PCRF node can dynamically generate QoS and charging rules for a UE device. The PCRF node can continuously feed the PGW and SGW nodes with real-time QoS rules. Rather than generating the QoS and charging rules in real-time by accessing many different tables, service policies including an entire rule set that can be applied to UE device traffic can be precomputed and stored in the precomputed policy data store 422. For example, rules including QoS rules (e.g., bit rate and loss rate), priority rules (e.g., flow handling during congestion) and charging rules (e.g., offline, online and time-dependent) can be consolidated into the precomputed policy data store 422.

Accordingly, the precomputation of network policies including security policies and service policies can increase resource-efficiency and minimize network access delay.

As described above, the embodiments described herein replace the notion of centralized HSS and PCRF with a precomputed policy data store replicated at different core agents across a distributed network. Hence, it is important for UE device states and policies to be consistent across the core agents, especially during UE device mobility. Reactive approaches to consistency management (e.g., distributed hash table or DHT) put wireless (inter-device) links on the critical path of control functions.

As further described above, the embodiments described herein avoid this real-time dependence and accelerate the handling of mobility events by adopting a proactive synchronization of states between core agents, where core agent proactively broadcasts changes to UE device states and policies to other core agents in the network. Such an approach minimizes the control plane delay between core agents (e.g., in mobility scenarios as the destination core agent already knows the latest information about the mobile UE device), enables seamless handoff of active UE devices to a neighboring device when the current device goes down for a recharge, and is scalable because the amount of control plane traffic that is broadcasted is negligible compared to user data plane traffic among the core agents.

To build up a consistent network-wide view of UE states, each core agent can send the following three types of broadcast update messages in the network: (1) security update to notify other core agents that it has used one of the pairs of security vectors precomputed for a UE device and to request other agents to invalidate the pair of security vectors; (2) location update to notify other core agents that a particular UE device has attached to a corresponding device; and (3) policy update to communicate local changes to the precomputed QoS and charging profile of a UE device.

With respect to idle-mode mobility events (e.g., paging), the underlying design in the network can limit each device to its own tracking area. Hence, when an idle-mode UE device moves from one device to another, a change in its timing advance (TA) can be realized upon waking up (e.g., prompted by a periodic timer), and the UE device can send a TA update request to the core agent on the new device. Since the core agent at the new device already has the idle-mode UE device's latest policies and states from the proactive updates, the core agent at the new device knows which security vectors to use for communication with the idle-mode UE device. Hence, the core agent at the new device immediately sends a response to the TA update request back to the idle-mode UE device, which can then quickly switch back to its idle-mode to continue saving power. The updated location of the idle-mode UE device can be broadcasted to the other core agents in the network, thereby eliminating the need for explicit UE device paging. This also ensures that the other core agents can push the correct label stack on the packets destined for the idle-mode UE.

With respect to active-mode mobility events (e.g., handoffs), an active-mode UE device can perform continuous signal strength measurements and send the signal strength measurements to a first device. If the base station of the first device determines that the signal strength of a neighboring second device is stronger, the base station of the first device sends a handoff request message to the core agent of the first device, which then notifies the core agent on the second device of the incoming UE device (without having to transfer/update any state on the core agent of the second device). The core agent of the second device confirms the handoff with the base station of the second device, which then informs the UE device of the handoff. The UE device then connects to the base station of the second device, and the core agent of the second device notifies all other core agents in the network with a location update for the UE device. Then, the core agent of the first device pushes the updated label stack corresponding to the UE device onto its pending downlink packets, and forwards them to the second device.

Figure 5:
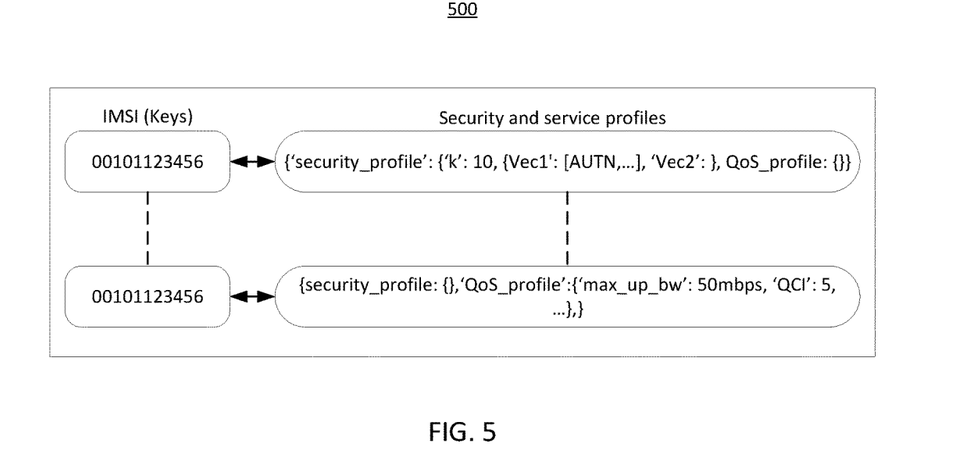
FIG. 5 is a diagram illustrating a precomputed policy data store, in accordance with the present principles.

Referring now to FIG. 5, an exemplary precomputation of network policies 500 is shown. As shown, each IMSI (international mobile subscriber identity) of a UE device is associated with its precomputed policies, which can be quickly accessed by different applications on the core agent.

Embodiments described herein may be entirely hardware, entirely software or including both hardware and software elements. In a preferred embodiment, aspects of the present invention are implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
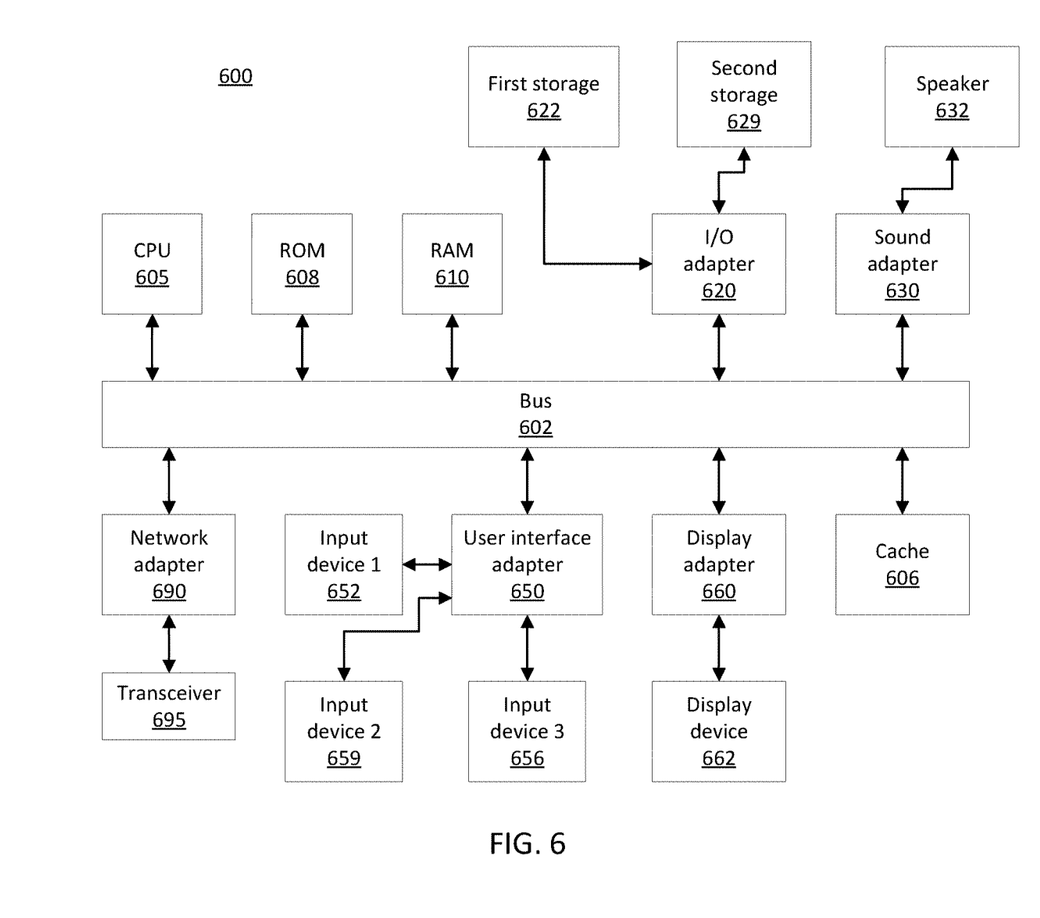
FIG. 6 is a block/flow diagram illustrating a computer system, in accordance with the present principles.

Referring now to FIG. 6, an exemplary computer system 600 is shown which may represent a server or a network device, in accordance with an embodiment of the present invention. The computer system 600 includes at least one processor (CPU) 605 operatively coupled to other components via a system bus 602. A cache 606, a Read Only Memory (ROM) 608, a Random-Access Memory (RAM) 610, an input/output (I/O) adapter 620, a sound adapter 630, a network adapter 690, a user interface adapter 650, and a display adapter 660, are operatively coupled to the system bus 602.

A first storage device 622 and a second storage device 629 are operatively coupled to system bus 602 by the I/O adapter 620. The storage devices 622 and 629 can be any of a disk storage device (e.g., a magnetic or optical disk storage device), a solid state magnetic device, and so forth. The storage device 622 and 629 can be the same type of storage device or different types of storage devices.

A speaker 632 may be operatively coupled to system bus 602 by the sound adapter 630. A transceiver 695 is operatively coupled to system bus 602 by network adapter 690. A display device 662 is operatively coupled to system bus 602 by display adapter 760.

A first user input device 652, a second user input device 659, and a third user input device 656 are operatively coupled to system bus 602 by user interface adapter 650. The user input devices 652, 659, and 656 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 652, 659, and 656 can be the same type of user input device or different types of user input devices. The user input devices 652, 659, and 656 are used to input and output information to and from system 600.

Of course, the computer system 600 may also include other elements (not shown), as readily contemplated by one of skill in the art, as well as omit certain elements. For example, various other input devices and/or output devices can be included in computer system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 600 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for implementing a distributed core architecture of a wireless communication network, comprising:
   a plurality of devices configured to communicate with one or more UE devices to implement the wireless communication network;
   wherein a given one of the plurality of devices includes:
     at least one processor operatively coupled to a memory; and
     a core agent implemented by the at least one processor, the core agent including:
       a controller for controlling functionality of the device;
       a switch operatively coupled to the controller;
       a precomputed policy data store for storing precomputed policies associated with at least security and service;
       mobility and policy applications; and
       a set of core applications including an inter-agent communication application for communicating with other core agents associated with other devices of the wireless communication network, and a control application for controlling the device;
   wherein the core agent is further configured to send a plurality of broadcast update messages to build a consistent network-wide view of UE device states, the plurality of broadcast update messages including:
     a security update to notify the other core agents that the core agent has used a pair of security vectors precomputed for a particular UE device and to request the other agents to invalidate the pair of security vectors;
     a location update to notify the other agents that a particular UE device has attached to the core agent; and
     a policy update to communicate local changes to at least one of the precomputed policies of a particular UE device.

2. The system of claim 1, wherein the wireless communication network includes a Long-Term Evolution (LTE) network.

3. The system of claim 2, wherein the mobility application implements mobile management entity (MME) functionality and the policy application implements Serving Gateway (SGW) and Packet Data Network (PDN) node Gateway (PGW) functionality.

4. The system of claim 2, wherein the controller implements control plane functionality, and wherein the precomputed policy data store implements Home Subscriber Service (HSS) functionality and Policy and Charging Rules Function (PCRF) functionality.

5. The system of claim 1, wherein the precomputed policy data store is an in-memory data store within the controller.

6. The system of claim 1, wherein the switch performs one or more of data rate enforcement, firewall operations, Quality of Service (QoS) control and tunneling protocol processing.

7. The system of claim 1, wherein the core agent is a master agent configured to perform global optimization of the wireless communication network by reconfiguring placement and traffic routing rules of the devices of the wireless communication network based on information collected from the other core agents.

8. The system of claim 7, wherein the information collected from the other agents is selected from the group consisting of: loss rate on links between the other nearby agents, remaining battery information, an amount of traffic exchanged between the devices, and combinations thereof.

9. A system for implementing a distributed core architecture of a wireless communication network, comprising:
   one or more user equipment (UE) devices located within an area; and
   a plurality of devices configured to communicate with the one or more UE devices to implement the wireless communication network;
   wherein a given one of the plurality of devices includes:
     at least one processor operatively coupled to a memory; and
     a core agent implemented by the at least one processor, the core agent including:
       a controller for controlling functionality of the device;
       a switch operatively coupled to the controller;
       a precomputed policy data store for storing precomputed policies associated with at least security and service;
       mobility and policy applications; and
       a set of core applications including an inter-agent communication application for communicating with other core agents associated with other devices of the wireless communication network, and a control application for controlling the device;
   wherein the core agent is further configured to send a plurality of broadcast update messages to build a consistent network-wide view of UE device states, the plurality of broadcast update messages including:
     a security update to notify the other core agents that the core agent has used a pair of security vectors precomputed for a particular UE device and to request the other agents to invalidate the pair of security vectors;
     a location update to notify the other agents that a particular UE device has attached to the core agent; and
     a policy update to communicate local changes to at least one of the precomputed policies of a particular UE device.

10. The system of claim 9, wherein the wireless communication network includes a Long-Term Evolution (LTE) network.

11. The system of claim 10, wherein the mobility application implements mobile management entity (MME) functionality and the policy application implements Serving Gateway (SGW) and Packet Data Network (PDN) node Gateway (PGW) functionality.

12. The system of claim 10, wherein the controller implements control plane functionality, and wherein the precomputed policy data store implements Home Subscriber Service (HSS) functionality and Policy and Charging Rules Function (PCRF) functionality.

13. The system of claim 9, wherein the precomputed policy data store is an in-memory data store within the controller.

14. The system of claim 9, wherein the switch performs one or more of data rate enforcement, firewall operations, Quality of Service (QoS) control and tunneling protocol processing.

15. The system of claim 9, wherein the core agent is a master agent configured to perform global optimization of the wireless communication network by reconfiguring placement and traffic routing rules of the devices of the wireless communication network based on information collected from the other core agents.

16. The system of claim 15, wherein the information collected from the other agents is selected from the group consisting of: loss rate on links between the other nearby agents, remaining battery information, an amount of traffic exchanged between the devices, and combinations thereof.

* * * * *